(12) United States Patent
Guercioni

(10) Patent No.: US 8,701,269 B2
(45) Date of Patent: Apr. 22, 2014

(54) METHODS FOR FORMING FEMALE CONNECTORS INTEGRAL WITH THE STATOR WINDING CONDUCTORS

(75) Inventor: Sante Guercioni, Teramo (IT)

(73) Assignee: Tecnomatic, S.p.A., Teramo, Corropoli (IT)

( * ) Notice: Subject to any disclaimer, the term of this patent is extended or adjusted under 35 U.S.C. 154(b) by 1130 days.

(21) Appl. No.: 12/582,552

(22) Filed: Oct. 20, 2009

(65) Prior Publication Data

US 2010/0038982 A1 Feb. 18, 2010

Related U.S. Application Data

(62) Division of application No. 11/728,105, filed on Mar. 22, 2007, now abandoned.

(51) Int. Cl.
*H02K 15/00* (2006.01)

(52) U.S. Cl.
USPC .................. 29/596; 29/857; 29/861; 29/863

(58) Field of Classification Search
USPC ........... 29/596, 505, 517, 598, 605, 606, 863, 29/857, 861; 310/71, 180, 201, 208
See application file for complete search history.

(56) References Cited

U.S. PATENT DOCUMENTS

| | | |
|---|---|---|
| 1,070,899 A | 8/1913 | Kratz |
| 1,751,405 A | 3/1930 | Herman |
| 2,286,097 A * | 6/1942 | Johnson .......................... 29/863 |
| 3,704,489 A | 12/1972 | Rudd |
| 3,861,780 A | 1/1975 | Hobbs, II |
| 4,746,048 A | 5/1988 | Kawaguchi |
| 5,309,954 A | 5/1994 | Franssen |
| 6,737,772 B2 | 5/2004 | Tanaka et al. |
| 6,862,797 B2 | 3/2005 | Neet |
| 2002/0043882 A1 | 4/2002 | Tanaka et al. |
| 2005/0029891 A1 | 2/2005 | Okada et al. |

FOREIGN PATENT DOCUMENTS

CN 1581644 2/2005

OTHER PUBLICATIONS

"Office Action Dated Feb. 12, 2010; Chinese Patent Application No. 200810084458.4", (Feb. 12, 2010).
"Office Action Dated Sep. 10, 2010; Chinese Patent Application No. 200810084458.4", (Sep. 10, 2010).

* cited by examiner

*Primary Examiner* — Thiem Phan
(74) *Attorney, Agent, or Firm* — Blakely Sokoloff Taylor & Zafman LLP

(57) ABSTRACT

Methods for forming female connectors integral with stator winding conductors, thereby avoiding the necessity of using a separate female connector. A typical connector in accordance with the present invention has a first length of the wire adjacent an end of the wire striped of insulation, and a second length of the wire adjacent the end not greater than the first length of wire being bent in a substantially closed loop, the loop preferably being pressed flat so as to have a thickness less than the wire. Also preferably the wire bends in a first direction and then bends in a circular arc to form the loop, the center of the loop being substantially aligned with a center of the wire. Various embodiments are disclosed as are exemplary simple methods for forming the female connector.

10 Claims, 3 Drawing Sheets

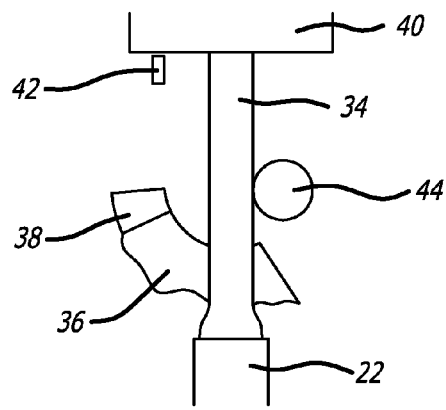
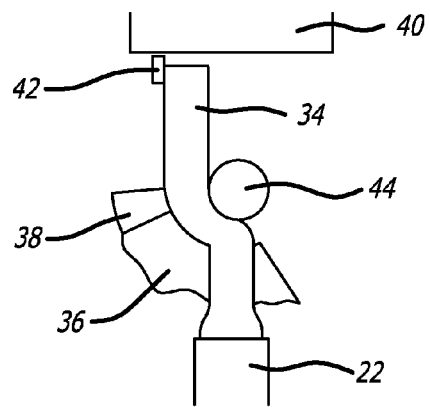
FIG. 4    FIG. 5
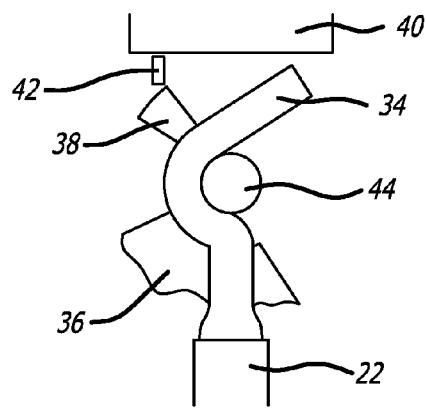
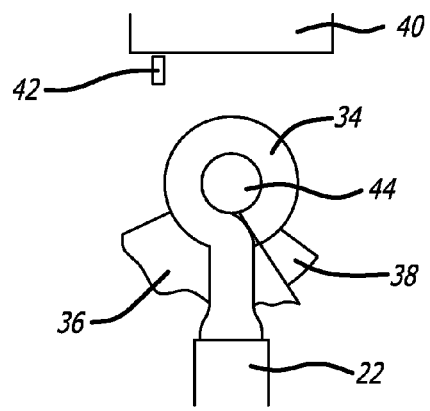
FIG. 6    FIG. 7
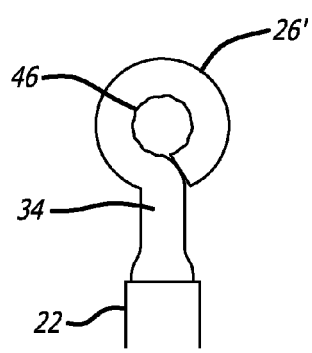
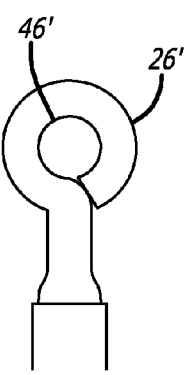
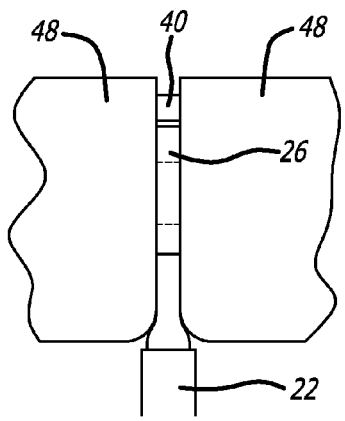
FIG. 8    FIG. 9    FIG. 10

METHODS FOR FORMING FEMALE
CONNECTORS INTEGRAL WITH THE
STATOR WINDING CONDUCTORS

CROSS-REFERENCE TO RELATED
APPLICATION

This application is a divisional of U.S. patent application Ser. No. 11/728,105 filed Mar. 22, 2007.

BACKGROUND OF THE INVENTION

1. Field of the Invention

The present invention relates to the field of motor stators and other wire wound electromagnetic devices.

2. Prior Art

Tecnomatic S.p.A., assignee of the present invention, has in the past made a limited number of motor stators and D.C. motor rotors using flat or square wire for the windings. In that regard, it is to be noted that as used herein, "flat" or "square" wire means wire having four substantially flat sides, each joined to adjacent sides, typically by a rounded edge. In the case of square wire, the wire may be formed in the square shape and then coated with typical winding insulation, or in some cases, pre-coated round wire has been rolled into the square shape. Rolling of round wire to a square shape has definite limits if the insulation is not to be damaged, though smaller rounded edges may be achieved if the wire is first formed by drawing or otherwise formed into the square shape and then coated. Even if the wire is first formed in the desired shape and then coated, some degree of rounding on the edges is desired for various reasons, including prevention of surface tension from pulling the coating away from the sharp edges during coating, preventing the sharp edges from cutting through the coating afterward, and preventing electric field concentration on the sharp edges to induce early breakdown. Thus, as used herein, the words "square" or "flat" or equivalent words used to describe the cross-section of an insulated copper wire are used in the general sense and are not to be construed as excluding significant or substantial rounded corners joining the substantially flat sides. "Flat" as used herein and in the claims means having two opposite sides having a greater separation than the other two opposite sides, its width being greater than its thickness. "Straight" as used herein and in the claims means substantially free of bends. Accordingly, either a flat or a square conductor may or may not be straight. "Rectangular" as used herein is a more general term meaning flat or square, square being a special case of rectangular wherein the dimension between two opposite sides is equal to the dimension between the other two opposite sides.

The use of the rectangular wire for the windings produces very efficient and high power to weight ratio motors because of the greater cross-section of copper that can be put into a winding slot. For the leads to the windings, longer conductors are used to provide a protruding winding connection. However in the prior art, a separate female terminal needed to be connected to the winding connection, by swaging or otherwise, requiring a separate part and separate operation, and potentially providing a connection of varying resistance, unit to unit.

BRIEF DESCRIPTION OF THE DRAWINGS

FIGS. 4 through 7 progressively illustrate the basic formation of a preferred embodiment of the present invention.

FIG. 8 illustrates the female connector formed by the process illustrated in FIGS. 4 through 7.

FIG. 9 illustrates the female connector of FIG. 9 after the center thereof is punched out.

FIG. 10 illustrates the female connector of FIG. 8 after pressing to slightly decrease the thickness thereof.

DETAILED DESCRIPTION OF THE PREFERRED
EMBODIMENTS

Figure 1:
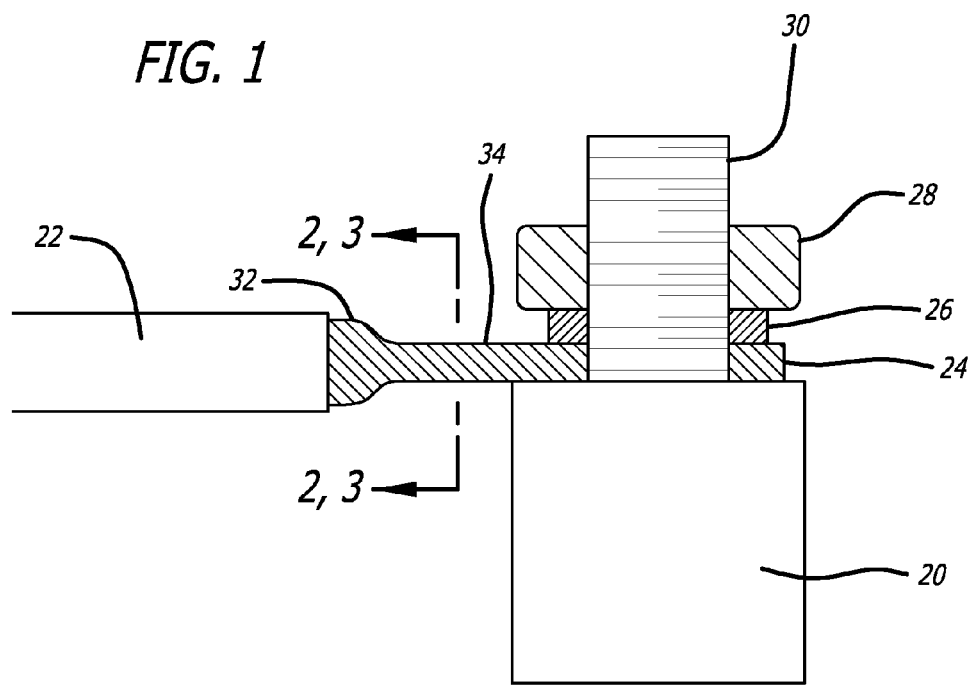
FIG. 1 illustrates a common use of the female connector of the present invention.
Figure 2:
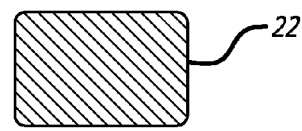
FIGS. 2 and 3 illustrate the cross section of two rectangular wires on which the present invention may be practiced.
Figure 3:
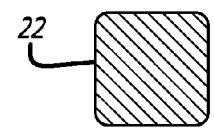

The present invention provides a female terminal formed directly from a rectangular conductor, eliminating the need for a separate female connector and a separate operation connecting the separate female connector to the rectangular conductor. Thus as may be seen in FIG. 1, a terminal post 20, shown relatively schematically, is connected to an insulated winding wire 22 by a female connector 24 made integral therewith. A washer 26 may be used with a terminal nut 28 on a smaller diameter threaded portion 30 clamping the washer and female terminal 24 to the terminal 20. The wire 22 as used in the present invention is rectangular wire that may be flat such as shown in FIG. 2, or that may be square, as shown in FIG. 3. The insulated wire 22 in the preferred embodiment is characterized by a short region 32 (FIG. 1) from which the insulation has been removed, such as by mechanical or other means, and a somewhat thinner rectangular wire region 34 forming the female connector 26. In that regard, note that the drawings are schematic only and not to scale, the differences in thicknesses, etc. being exaggerated for clarity.

The method of forming the rectangular wire is illustrated in FIGS. 4 through 8. As shown in FIG. 4, the stripped end 34 of insulated winding conductor 22 is placed in a fixture having a stationary portion 36, a rotatable forming member 38, a stop 40 for determining the length of the stripped wire 34 extending into the fixture, and alternatively, a second stop 42, the purpose of which shall be subsequently shown.

The first step in the forming operation is to move pin 44 to the left, forming the stripped portion 34 to the shape shown in FIG. 5. In that regard, the optional stop 42, if used, confines the distal end of the stripped wire 34 to provide the shape of FIG. 5, though this is only an intermediate bending shape, and if the stop is not used, the remainder of the process may proceed as described. In particular, rotatable forming member 38 is rotated about the new center of pin 44, as shown in FIGS. 6 and 7. The net result of this forming operation is a female connector 26' formed on the end of the stripped section 34 of insulated wire 22, which may be directly used as a female connector if desired. However in the preferred embodiment, two additional operations are performed. Specifically, the inner diameter 46 of the female connector 26' normally is not perfectly round. Accordingly, in the preferred process, the center of the female connector 26' is punched out to provide a nice circular inner diameter, as shown in FIG. 9. Also in the preferred method, the female connector 26' is pressed between press anvils 48 to somewhat reduce the thickness of the female connector 26. In general, the amount of reduction in thickness preferably is relatively minimal, though the pressing operation has the advantage of providing flat surfaces on each side of the female connector so that when connected to a terminal post, such as that schematically shown in FIG. 1, the contact with the post will be over the full face area of the female connector and not merely on the high spots thereof.

As mentioned before, the present invention may be practiced on any rectangular wire, such as square wire or flat wire. It may also even be practiced on round wire, though in the case of round wire, greater flattening would typically be desired to present adequate area of the faces of the resulting female connector.

As previously mentioned, the punching of the center of the female connector, typically punching a minimal amount of conductive material from the center, and the pressing are each optional, though both are preferred for cosmetic and electrical purposes. Similarly, if both are used, punching may precede pressing, though pressing before punching has the advantage of assuring a round opening and of flattening any burrs raised by the punching process, which burrs might provide a high spot and result in only very local contact on a terminal post or other connection, resulting in a high resistance at that point.

Figure 11:
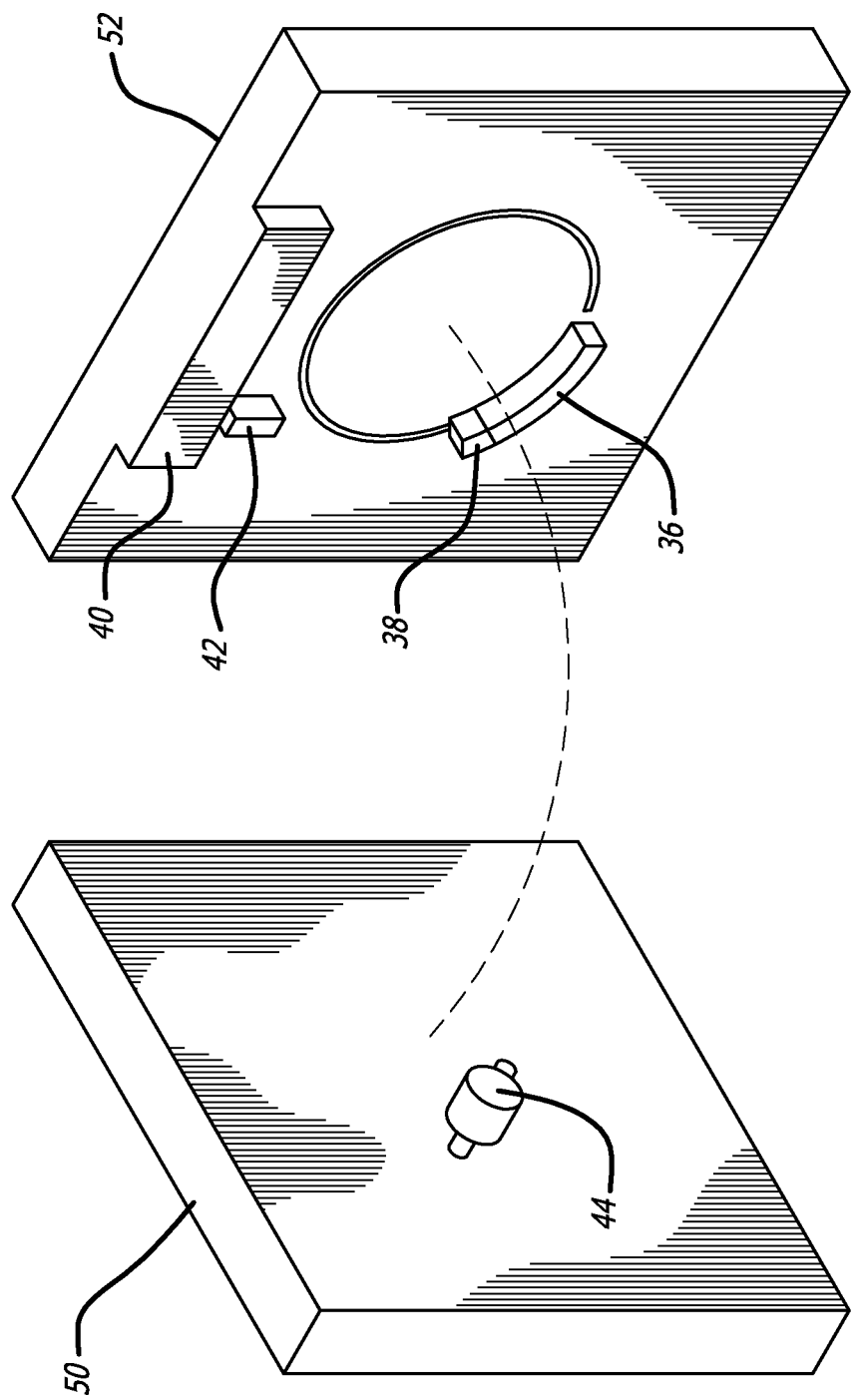
FIG. 11 is a schematic illustration of a fixture for forming the female connector of the present invention.

FIG. 11 schematically illustrates the concept of tooling that may be used to form the female connector of the present invention. In particular, the bending particularly of flat wire needs to be constrained, as otherwise the wire will tend to twist and bend about the thinner dimension. Thus plates 50 and 52 are provided and held in separation by an amount equal to or slightly wider than the stripped wire. Plate 50 has pin 44 therein, and would be configured for forced translation of pin 44, alone or together with plate 50, from the position illustrated in FIG. 4 to that illustrated in FIG. 5. The plate 52 has a rotatable center portion carrying forming member 38 that can be forceably rotated as illustrated in FIGS. 7 and 8. If the invention is practiced on round wire, confining plates may not be needed.

Figure 12:
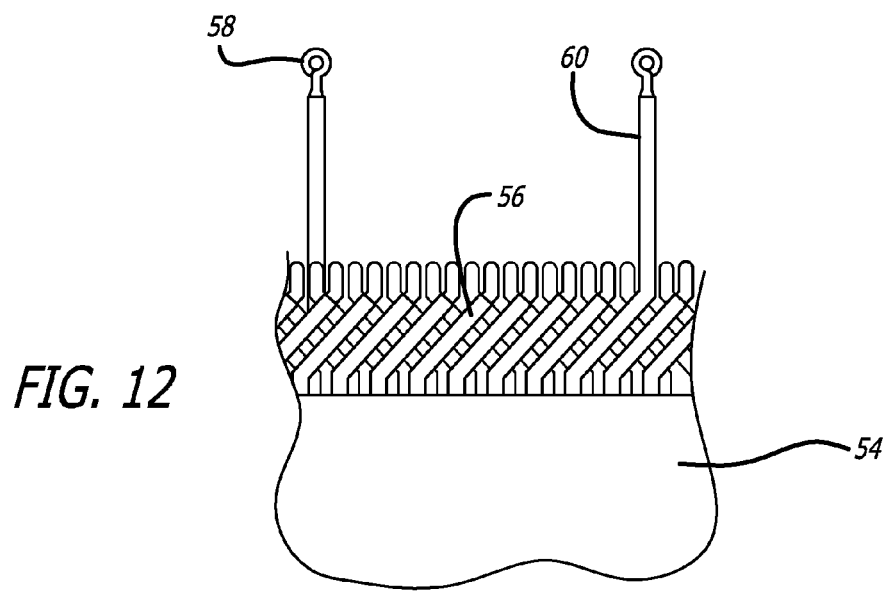
FIG. 12 shows a portion of a wound motor stator.

Now referring to FIG. 12, a portion of a wound motor stator may be seen. The windings in this specific embodiment are comprised of individual "U" shaped rectangular wires 56 inserted from the other end of the stator iron or core 54 and bent where they extend beyond the stator iron, with the tip ends being substantially parallel to the axis of the stator. The row of wires most visible in the Figure is bent to the right and the row immediately there below is similarly bent to the left, with the adjacent tip ends then being welded together, thereby forming end turns of the winding. To form the stator terminal 58 for the stator winding electrical connections, appropriate "U" shaped wires having one leg of an exceptional length are inserted from the opposite end of the stator iron, so that the extra length of wire 60 extends beyond the normal end turns. Preferably the terminal 58 is formed in the end of wire extension 60 after the winding is formed. Also, preferably the wire 60 is bent next to the stator iron with the other wires in the same row so as to not interfere with the other wires forming the winding. Of course the extra length of wire 60 may be of a predetemined length, and bent and/or twisted as needed to accommodate the particular application or the motor. Also, while the wire extension 60 and terminal 56 are shown in an outer row of wires in the stator, the wire extension 60 and terminal 56 may be formed in any wire row and in any number as needed for a specific motor design.

In the claims to follow, references to being bent in one direction and then in another direction are not references to the order of the bending in their fabrication methods, but rather the physical order of the bends. Similarly the order set forth in the method claims claim convenience, and may or may not reflect the actual order in which the various operations are carried out.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of fabricating a motor stator comprising:
   winding a motor stator core with an insulated rectangular wire, leaving one end of at least one insulated rectangular wire extending a first length beyond winding end turns;
   stripping the insulation from a second length of the extended wire adjacent the end thereof, the second length being less than the first length; and,
   bending the second end of the second length of the extended wire in a first direction in a plane parallel to opposite sides of the wire to form a substantially closed loop, and bending the second end of the second length of the extended wire in a second direction opposite the first direction in a circular arc in the plane to form a substantially closed loop having its center substantially aligned with the center of the width of the extended wire, the bending occurring while the second end of the extended wire is constrained between two plates.

2. The method of claim 1 further comprised of pressing the loop to flatten the wire.

3. The method of claim 2 further comprised of punching out the wire at the center of the loop to provide a predetermined diameter opening through the loop.

4. The method of claim 2 wherein pressing the loop also comprises pressing a length of wire between the second and the third length.

5. The method of claim 1 wherein the bending the end of the extended wire in a first direction in the plane comprises contacting the end of the extended wire with a pin.

6. The method of claim 5 further comprising moving the pin in the first direction after said contacting the end of the extended wire.

7. The method of claim 6 wherein bending the extended wire in a second direction comprises bending the extended wire around the pin.

8. The method of claim 6 wherein bending the extended wire in a second direction comprises bending the extended wire around the pin by rotating a forming member around an axis of the pin.

9. The method of claim 1 further comprising pressing a part of the second end of the extended wire to flatten the loop and part of an unbent portion of the second end of the extended wire.

10. The method of claim 1 wherein the two constraining plates are oriented perpendicularly to the bending axis of the second end of the extended wire.

* * * * *